US007743997B2

(12) United States Patent  (10) Patent No.: US 7,743,997 B2
Copeland et al.  (45) Date of Patent: Jun. 29, 2010

(54) HANDHELD COMBINATION BAR CODE AND RFID READER WITH INTEGRATED ELECTRONICS AND ANTENNA

(75) Inventors: Richard L. Copeland, Lake Worth, FL (US); Steven V. Leone, Lake Worth, FL (US); Larry K. Canipe, Boca Raton, FL (US)

(73) Assignee: Sensormatic Electronics, LLC., Boca Raton, FL (US)

( * ) Notice: Subject to any disclaimer, the term of this patent is extended or adjusted under 35 U.S.C. 154(b) by 31 days.

(21) Appl. No.: 12/124,557

(22) Filed: May 21, 2008

(65) Prior Publication Data

US 2009/0289116 A1  Nov. 26, 2009

(51) Int. Cl.
*G06K 7/10* (2006.01)
*G06K 7/00* (2006.01)
*G06K 9/22* (2006.01)

(52) U.S. Cl. .............. 235/472.01; 235/435; 235/462.45

(58) Field of Classification Search .................. 235/435, 235/462.45, 472.01
See application file for complete search history.

(56) References Cited

U.S. PATENT DOCUMENTS

| 6,149,062 A * | 11/2000 | Danielson et al. ...... 235/472.01 |
| 6,745,943 B2 * | 6/2004 | Schlieffers et al. ..... 235/472.01 |
| 7,504,948 B2 * | 3/2009 | Wulff et al. .............. 340/572.1 |
| 2006/0054704 A1 * | 3/2006 | Fitch et al. ............. 235/472.01 |

* cited by examiner

*Primary Examiner*—Thien M. Le
*Assistant Examiner*—April A Taylor
(74) *Attorney, Agent, or Firm*—Christopher & Weisberg, P.A.

(57) ABSTRACT

A handheld barcode/RFID reader includes a printed circuit board having a first side and a second side opposite the first side. The first side includes at least a portion of barcode/RFID electronic circuitry affixed thereto. The second side contains a ground plane for the electronic circuitry. The handheld barcode/RFID reader further includes a patch antenna, electrically coupled to the circuitry, and mounted on the second side of the printed circuit board such that the ground plane of the printed circuit board also provides a ground for the patch antenna.

20 Claims, 8 Drawing Sheets

Ideal Radiation Pattern

Radiation Pattern
for 53.3 cm² Ground Plane

Radiation Pattern
for 400 cm² Ground Plane

HANDHELD COMBINATION BAR CODE AND RFID READER WITH INTEGRATED ELECTRONICS AND ANTENNA

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to bar code and RFID readers, and more specifically to a handheld combination bar code and RFID reader sharing a common ground plane.

BACKGROUND OF THE INVENTION

Inventory control has always been an important aspect for successful operation of any supply chain enterprise, such as manufacturing, wholesale and retail sales facilities. Recent advances in automatic identification technology have greatly improved the accuracy of this process and tremendously reduced the time required to perform such tasks. Today, most wholesale and retail sales facilities employ a variety of automatic identification methods to provide accurate, up-to-the-minute knowledge of their entire stock at any given time.

Generally, most consumer products today are provided with a standard Universal Product Code (UPC), or custom store code represented as a barcode, which identifies the product. Facilities implement barcode readers at check out counters to determine the cost of the product without requiring a cashier to identify and "ring up" the appropriate item. Additionally, in many facilities, the item is automatically removed from a current inventory listing, providing an updated and accurate inventory at all times. Barcode readers are also implemented to track incoming inventory by scanning each item upon arrival. The barcode reader is often a portable handheld device equipped with radio frequency ("RF") capabilities, which enables the barcode reader to wirelessly upload information to a central tracking computer.

The barcode reader generally contains an optical scanner which reads information encoded in a barcode label located on packaging for an item. The barcode label has a series of parallel vertical stripes, with information embedded according to the width of each line and the width of the spaces between the lines. The barcode scanner illuminates the barcode with a red laser light. The scanner sensor detects the reflected light and generates an analog signal which is converted by a decoder to a digital code. The barcode reader may be physically or wirelessly connected to a computer system which stores and tracks the coded information in a variety of applications, including inventory control and purchase receipt applications.

A second automatic identification method, radio-frequency identification ("RFID"), is generally known. RFID systems may be used for a number of applications, such as managing inventory, electronic access control, security systems, and automatic identification of cars on toll roads. An RFID system typically includes an RFID reader and an RFID device commonly called RFID tags or transponders. The RFID reader may transmit a radio-frequency ("RF") carrier signal to the RFID device. The RFID device may respond to the carrier signal with a data signal encoded with information stored by the RFID device. An RFID is applied to or incorporated into a product for identification purposes.

The market need for combining barcode scanning and RFID functions in the retail environment is rapidly emerging. Many retail stores rely on bar code information for inventory control. Several conventional handheld bar code scanners have integrated RFID capabilities by adding an RFID antenna and reader module as an add-on to the original barcode reader. That is, the housing of the handheld barcode/RFID reader is enlarged or extended to provide a region where the RFID antenna and reader module can be located and interconnected to the other electronics associated with the bar code reader. The RFID antenna and RFID reader module are separate parts which are merely bolted together, typically in a stacked or "sandwiched" fashion, onto still other printed circuit boards ("PCBs") containing circuitry which enables the bar code reader functions. However, this stacked design is costly, time consuming to manufacture and adds additional volume and weight, rendering the actual barcode reading device cumbersome to carry.

Therefore, what is needed is a combination barcode/RFID reader that solves the above-described problems by producing a compact, lightweight unit that is easier to assemble than known combination units.

SUMMARY OF THE INVENTION

The present invention advantageously provides a handheld barcode/RFID reader, an RFID antenna module and a method for manufacturing an RFID antenna module. Generally, the present invention advantageously reduces the weight and size of a combination barcode/RFID reader by providing a self-contained RFID module containing a printed circuit board and a patch antenna. A ground plane on one side of the printed circuit board serves the dual role of providing ground for electronic circuitry and the patch antenna.

One aspect of the present invention includes a combination handheld barcode/RFID reader comprising a printed circuit board and a patch antenna. The printed circuit board has a first side and a second side opposite the first side. The first side has at least a portion of barcode/RFID electronic circuitry affixed thereto. The second side has a ground plane for the electronic circuitry. The patch antenna is electrically coupled to the RFID circuitry and mounted to the second side of the printed circuit board such that the ground plane of the printed circuit board provides a ground plane for the patch antenna.

In accordance with another aspect, the present invention provides an RFID antenna module including a printed circuit board and a patch antenna. The printed circuit board has a first side with at least some electronic RFID circuitry affixed thereto, and a second side opposite the first side. The second side has a ground plane for the electronic circuitry. The patch antenna is electrically coupled to the circuitry and mounted to the second side of the printed circuit board such that the ground plane of the printed circuit board provides a ground plane for the patch antenna.

In accordance with still another aspect, the present invention provides a method for manufacturing an RFID antenna module having a printed circuit board with a first side and a second side opposite the first side. The second side has a ground plane for electronic RFID circuitry. At least at least some of the electronic RFID circuitry is affixed to the first side. The patch antenna is mounted to the second side of the printed circuit board such that the ground plane of the printed circuit board provides a ground plane for the patch antenna

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
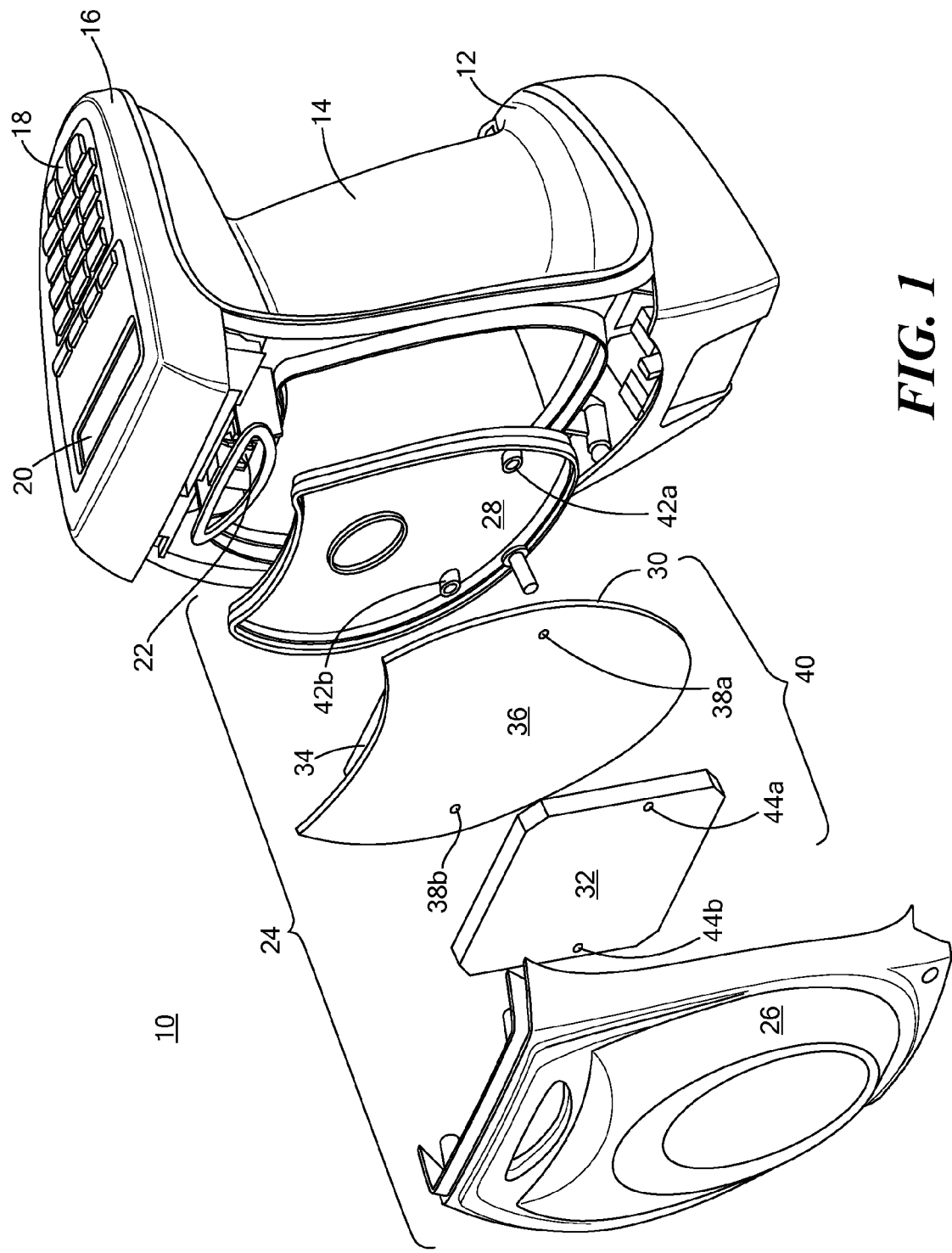
FIG. 1 is an exploded perspective view of an exemplary handheld combination barcode/RFID reader constructed in accordance with the principles of the present invention.

Before describing in detail exemplary embodiments that are in accordance with the present invention, it should be observed that the embodiments reside primarily in combinations of apparatus components and processing steps related to implementing a handheld combination barcode/RFID reader having an integrated patch antenna which shares a common ground plane with circuitry that performs the functional operations of the barcode/RFID reader. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention includes a handheld combination barcode/RFID reader having a base housing enclosing a barcode scanner, an RFID reader module, an RFID patch antenna, a display screen and a keypad. The handheld combination barcode/RFID reader uses a single printed circuit board ("PCB") to integrate the RFID antenna and RFID reader electronics. Electrical components of the RFID reader circuitry may be located on one side of the PCB, while the reverse surface includes a ground plane. The patch antenna is mounted to the reverse side of the PCB such that the ground plane on the reverse PCB surface serves a dual purpose of being both the ground plane for the RFID reader control circuits and the RFID antenna. The resulting combination handheld barcode/RFID reader is cheaper, lighter, and has better RF performance and less power loss than prior handheld combination barcode/RFID readers.

Referring now to the drawing figures in which like reference designators refer to like elements, there is shown in FIG. 1 an exploded perspective view of an exemplary handheld combination barcode/RFID reader device (hereinafter "reader device") constructed in accordance with the principles of the present invention and designated generally as "10". The exemplary reader device 10 includes a housing base 12 to contain/affix the electronic components for operation. The housing base 12 also includes a handle 14 which allows the user to conveniently carry and operate the reader device 10. A user interface module 16, containing an input keypad 18 and a display screen 20 is positioned on the top portion of the housing base 12 such that the user can easily read information displayed on the display screen 20 during use. The exemplary reader device 10 further includes an optical scanner 22 for reading barcode labels. The user simply points the optical scanner 22 at the barcode label to automatically begin scanning the label, or optionally, enters a command into the user interface module 16 through the keypad 18 or trigger (not shown) to instruct the optical scanner 22 to begin scanning and/or the RFID reader to interrogate the RFID tag on the protected article. Operation of barcode scanners and RFID readers are generally known and are beyond the scope of the present invention.

The exemplary reader device 10 may also include an RFID module 24 which includes a front housing cover 26 and a back housing cover 28 encapsulating a printed circuit board ("PCB") 30 and a patch antenna assembly 32 used for RFID functions. The RFID module 24 provides a self-contained RFID unit that is readily detachable from the housing base 12 for easy assembly. One side of the PCB 30 retains the electronic components 34 necessary to implement the RFID functions and control features of the reader device. The reverse side of the PCB 30 contains a ground plane 36. The ground plane 36 serves the dual role of providing an electrical ground for the RFID and control circuitry as well as providing a physical ground connection for the patch antenna assembly 32. The ground plane 36 may be permeated in certain areas with voided areas surrounding connection "vias", holes 38 or slots (not shown) as needed to allow for PCB fabrication, signal routing, signal grounding arrangements and mounting schemes as known in the art. In the exemplary reader device 10 shown in FIG. 1, the patch antenna assembly 32 is mounted to the PCB 30 to form a PCB/patch antenna module 40 using screws (not shown), or other fixation devices which are inserted into screw retaining bosses 42a, 42b in the back housing cover 28. The screws extend through holes 38a, 38b located in the PCB 30 and holes 44a, 44b located in the patch antenna assembly 32, and are secured to screw receptacles (not shown) located in the front housing cover 26. Alternatively, the patch antenna assembly 32 may be mounted to the PCB 30, or the entire antenna module 40 may be mounted to the front housing cover 26 or back housing cover 28 using a snap feature or other mounting scheme. Because the patch antenna assembly 32 is mounted directly to the back surface of the PCB 30, the signal path from the antenna to the RFID components 34 is shorter than normally seen in handheld combination barcode/RFID readers using a "stacked module" construction approach. Thus, the power loss from the antenna to the RFID circuitry is advantageously reduced.

Figure 2:
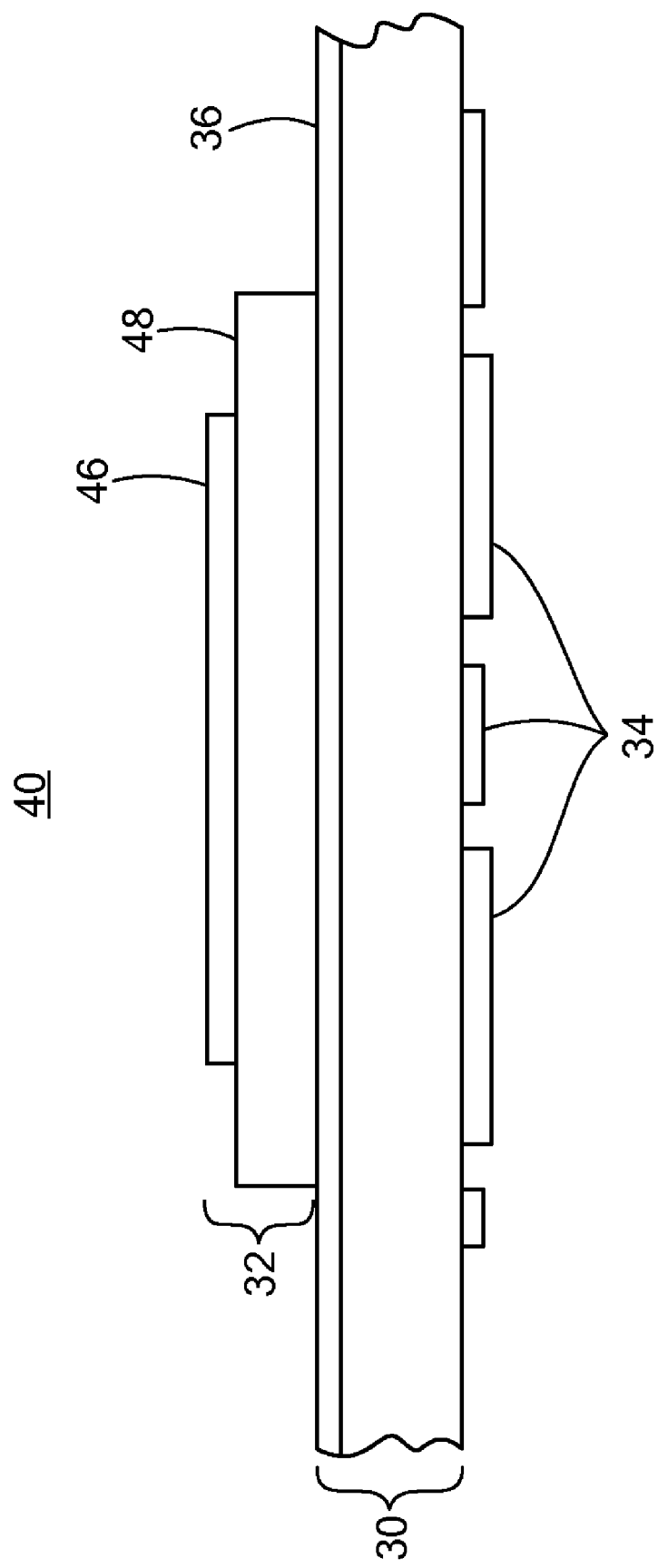
FIG. 2 is a cross-sectional view of an exemplary PCB/patch antenna module constructed in accordance with the principles of the present invention.

Referring now to FIG. 2, a cross-sectional view of a partial exemplary PCB/patch antenna module 40 is shown. A metal patch 46 is positioned on a dielectric material 48 to provide separation from the reflecting ground plane 36. The metal patch 46 is typically constructed from copper material etched away from the dielectric 48. The length and/or width of the metal patch 46 is typically a half-wave length of the desired resonant frequency, thus the frequency response of the metal patch 46 may be shifted higher by etching away portions of the copper metal. The patch antenna is tuned to operate at a desired operating frequency, typically in the UHF range.

The most common type of dielectric substrate material 48 is a ceramic, however, the dielectric material 48 may be any dielectric or insulating material commonly used in the construction of patch antennas, including but not limited to ceramics. In one embodiment, a high dielectric constant material, such as ceramic with a relative dielectric constant of about 10 or more and a dielectric loss factor of about 0.01 or less is desired. An exemplary dielectric substrate material 48, Arlon 1000 ceramic/Teflon compound material offers a dielectric constant of about 10, a dielectric loss factor of about 0.005, and is highly machinable and non-fragile, all of which are desirable for a handheld portable device that may be dropped on a hard surface. Other examples of ceramic dielectric substrate materials include ECCOSTOCK HIK material by Emerson & Cuming Microwave Products, Inc. and MCT ceramic material by Trans-Tech.

The actual copper ground plane 36 is constructed as the bottom layer of the PCB 30, in which the top side is populated by the electronic circuitry components 34 used for the RFID functions and control circuits of the reader device 10. Thus, the ground plane 36 is shared by the electronic circuitry 34 and the patch antenna assembly 32.

Figure 3:
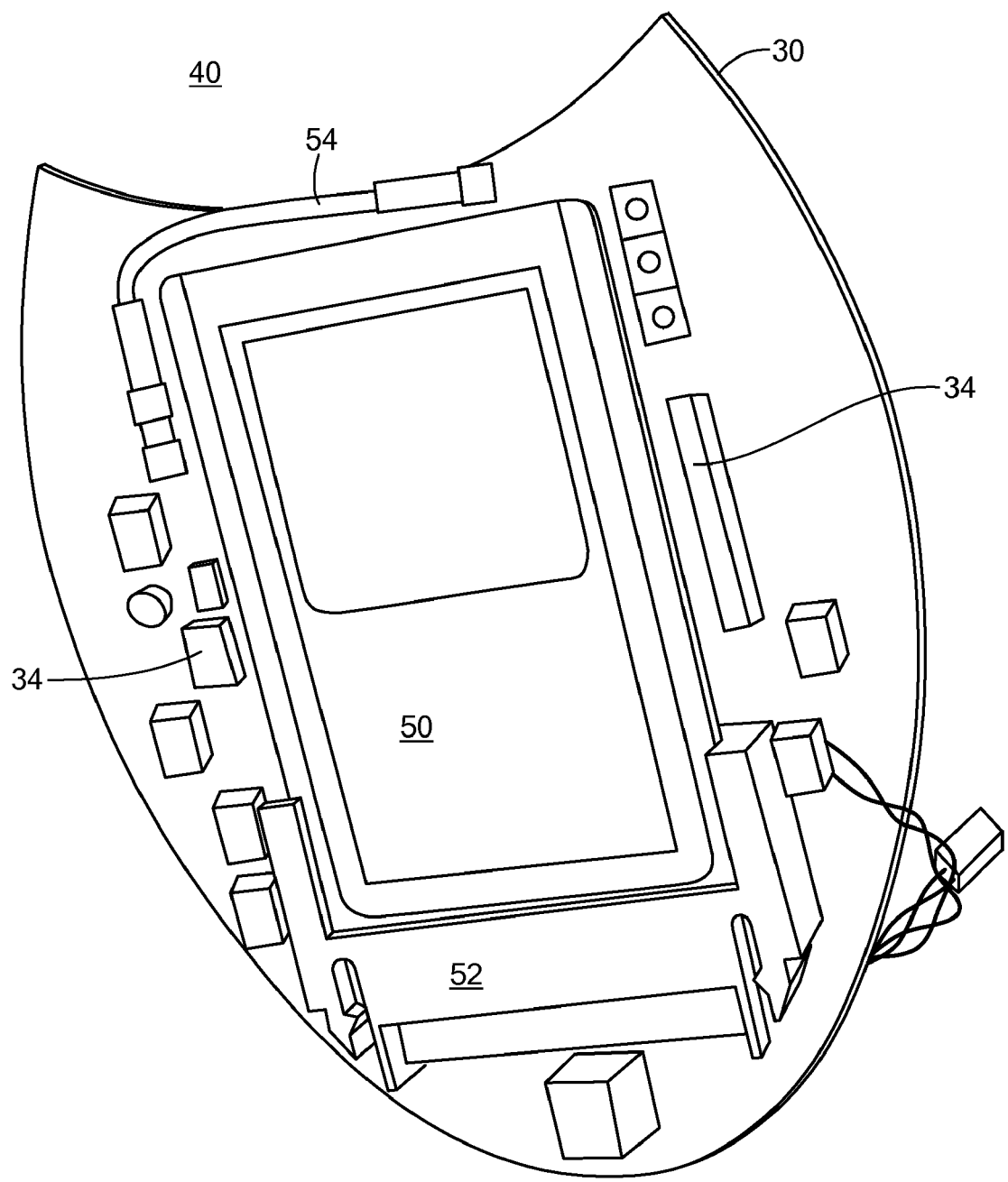
FIG. 3 is a perspective view of a component side of an exemplary PCB/patch antenna module constructed in accordance with the principles of the present invention.

FIG. 3 is a perspective view of the component side of an exemplary PCB/patch antenna module 40 constructed in accordance with the principles of the present invention. The top side holds the electronic components 34 that perform the RFID functions, as well as the barcode detection functions, including but not limited to, an RFID module 50 and corresponding RFID card mounting connector 52. Additionally, the top side may include an RF connector 54 providing electrical connection between the RFID card 50 and the active metal patch 46 of the patch antenna assembly 32. In the exemplary PCB/patch antenna module 40 illustrated in FIGS. 3 and 4, no other electronic components 34 except for the patch antenna assembly 40 are typically positioned on the reverse side of the PCB 30, i.e. physically located on the ground plane side of the PCB 30. However, in certain instances where space on the top side, i.e. the component side, is not available, it is contemplated that components can be located on the reverse side of the PCB 30.

Figure 4:
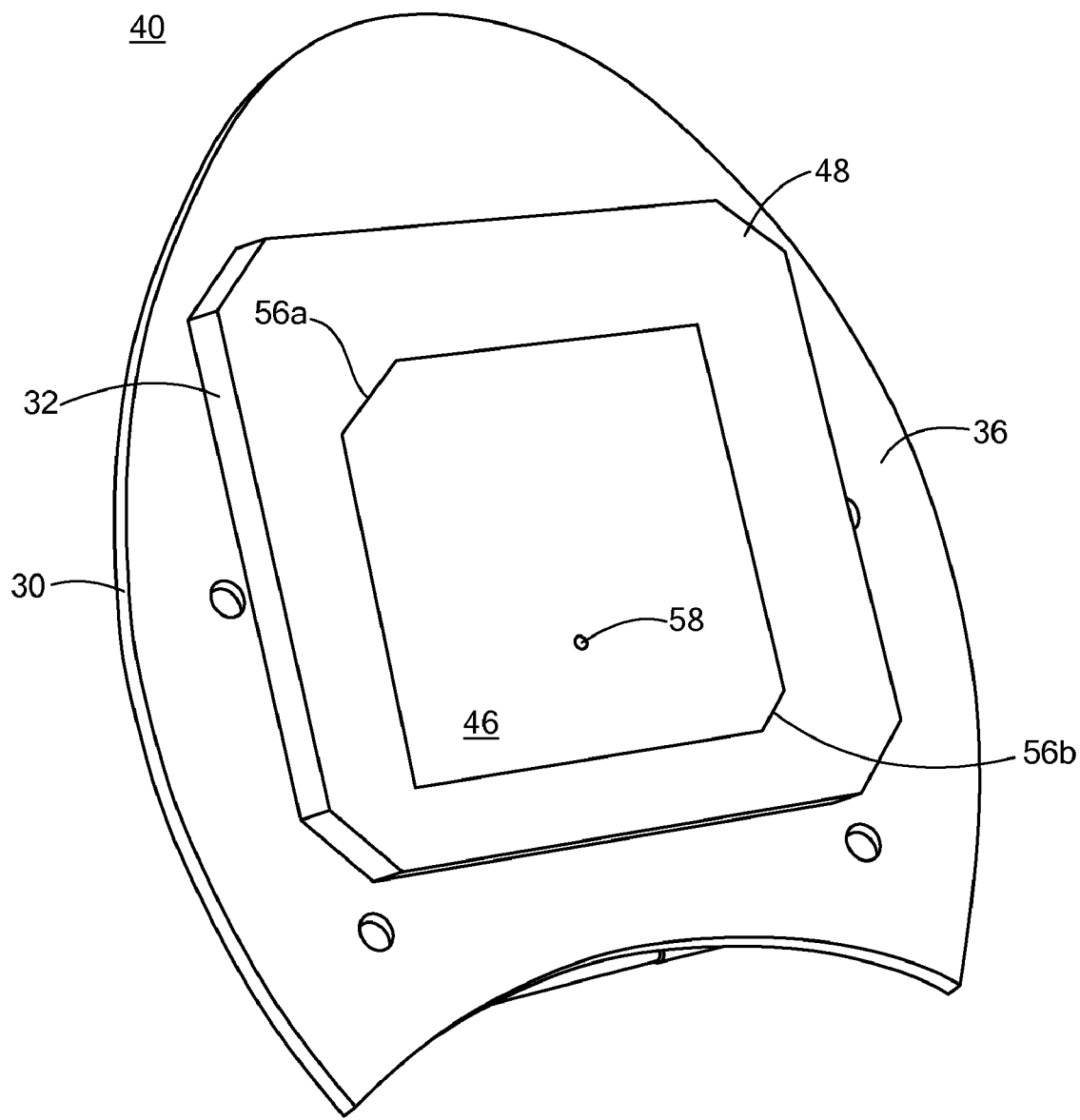
FIG. 4 is a perspective view of a patch antenna side of an exemplary PCB/patch antenna module constructed in accordance with the principles of the present invention.

FIG. 4 is a perspective view of the bottom side of the exemplary PCB/patch antenna module 40 showing the patch antenna assembly 32 mounted to the PCB 30 constructed in accordance with the principles of the present invention. As clearly indicated, the actual area of the ground plane 36 resulting from the construction techniques of the present invention is considerably larger than the area of the active metal patch 46. In the exemplary module 40 shown in FIG. 4, the area of the ground plane 36 is approximately four times greater than the area of the metal patch 46. Thus, the size of the dielectric material 48 may also be reduced to approximately the size of the active metal patch 46, thereby saving the amount of material required for the dielectric 48 and resulting in reduced cost and weight of the antenna module, and thus, overall reader device 10.

In one embodiment, the active metal patch 46 is a square patch antenna that may have a pair of corner-truncated corners 56a, 56b (referred to collectively as 56) along a diagonal of the patch geometry. The truncated corners 56 provide circular polarization which improves the detection orientation of the RFID tag. Additionally, the metal patch 46 may include corner notches (not shown). The active metal patch 46 is connected to the RFID reader module 50 at a single feed point 58 using the RF connector 54 and routed through the PCB 30. The feed position 58 for the patch antenna is offset from the very center of the patch about halfway between the center and one of the edges as shown.

Figure 5:
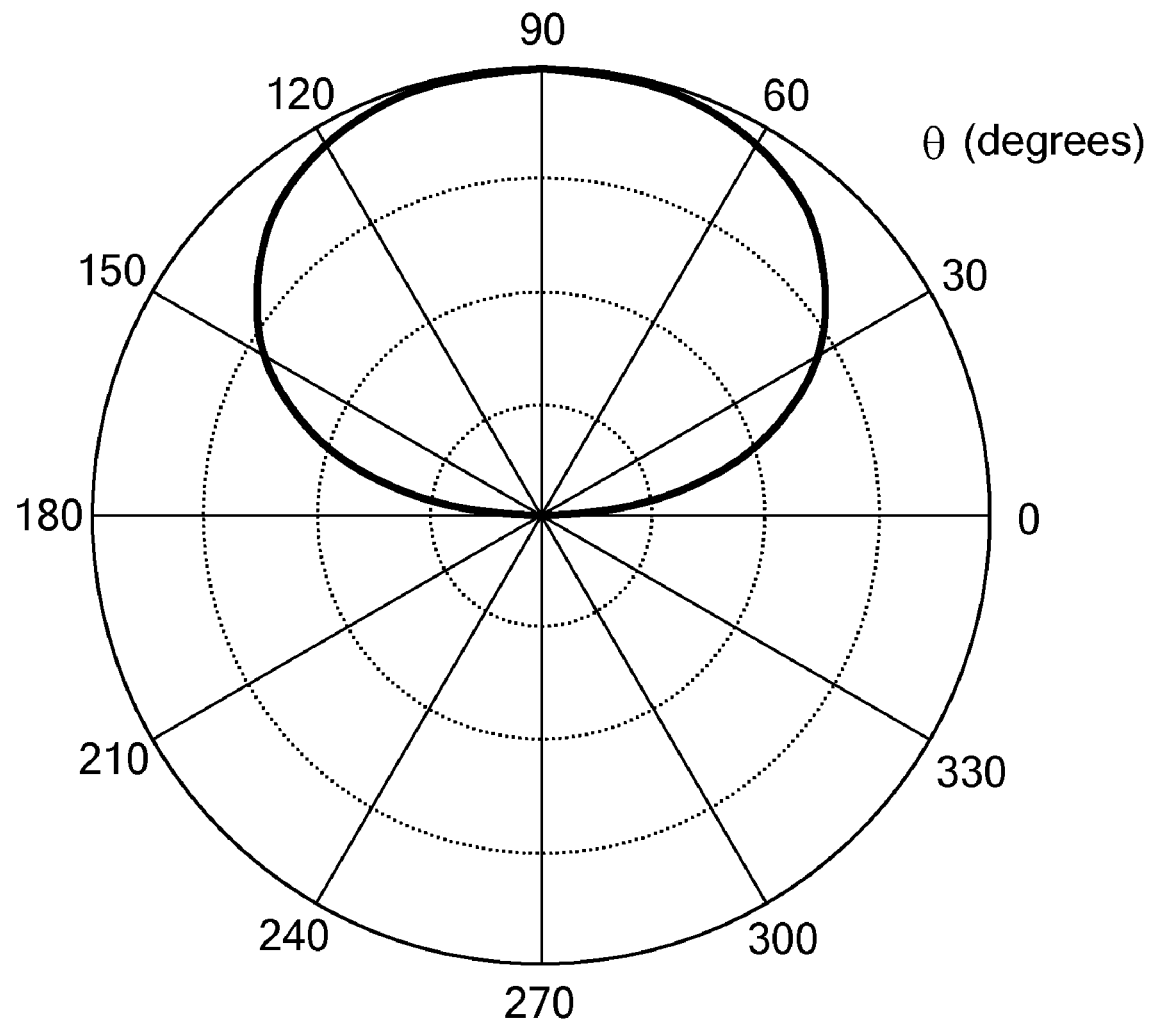
FIG. 5 is a radiation pattern illustrating the performance of an ideal art patch antenna.
Figure 6:
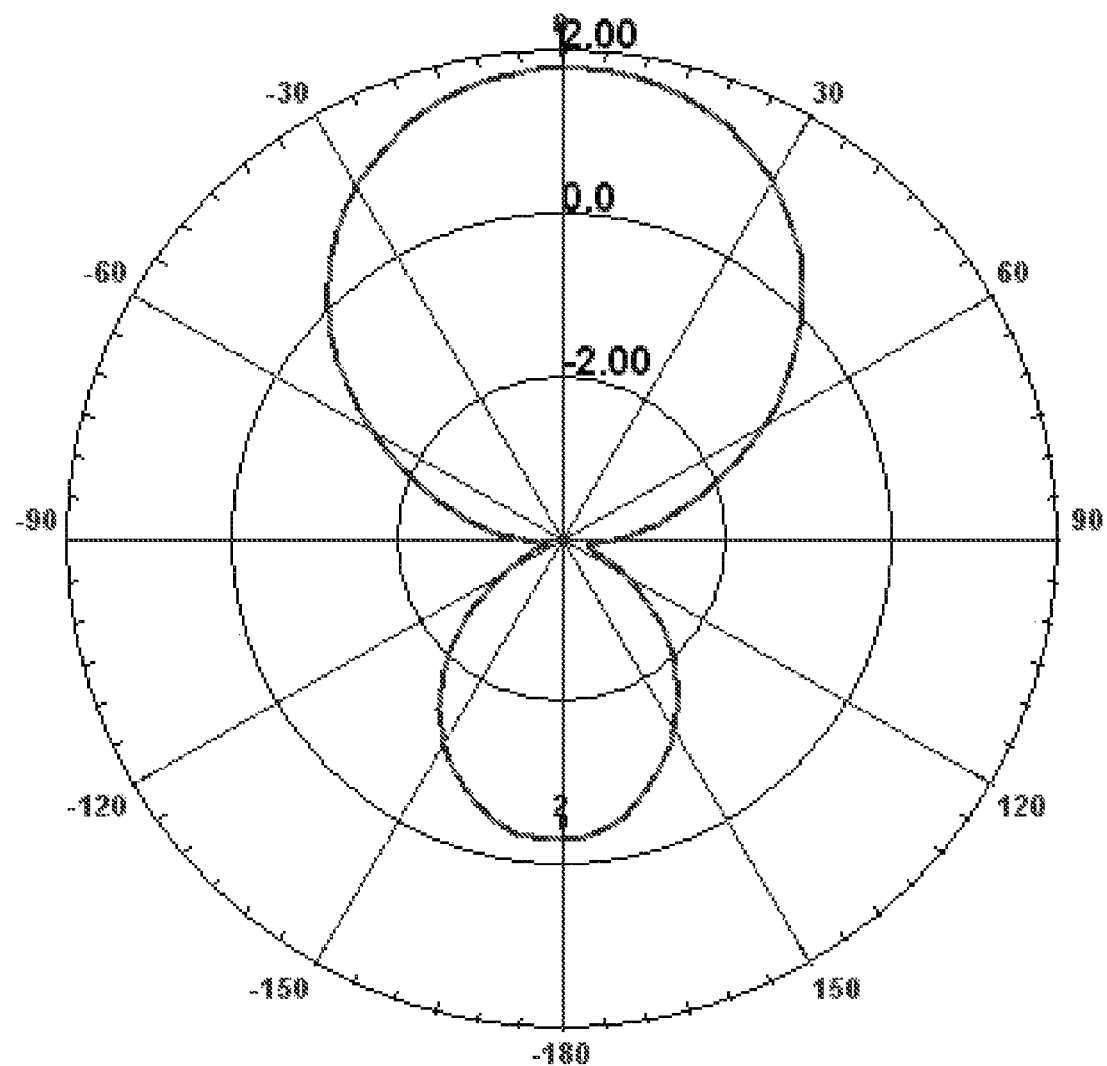
FIG. 6 is a radiation pattern illustrating the performance of a prior art patch antenna.

Traditional patch antennas are normally constructed as a single component having a metal patch on one side of the dielectric, with a ground plane adhered to and extending throughout substantially the entire area of the opposite side of the dielectric. Large ground planes provide better performance and increased antenna gain, but increase the overall size of the antenna. Thus, the commonly used construction generally results in the area of the ground plane being only slightly larger than the area of the active metal patch. In an ideal patch antenna, the reflecting ground plane theoretically extends to infinity in each direction, thereby preventing any radiation toward the back of the antenna, as shown in FIG. 5. In reality, where the ground plane is allowed to be very large, for a given fixed size dielectric substrate and patch antenna, the antenna gain will approach a maximum value with a patch size/ground plane size area ratio of about 15:1 or higher while the front/back ratio of the antenna radiation beam continues to rise as this area ratio is increased. For the case where the ground plane area is about two times that of the patch area, the antenna gain is approximately 1.8 dBi, as shown in FIG. 6.

Figure 7:
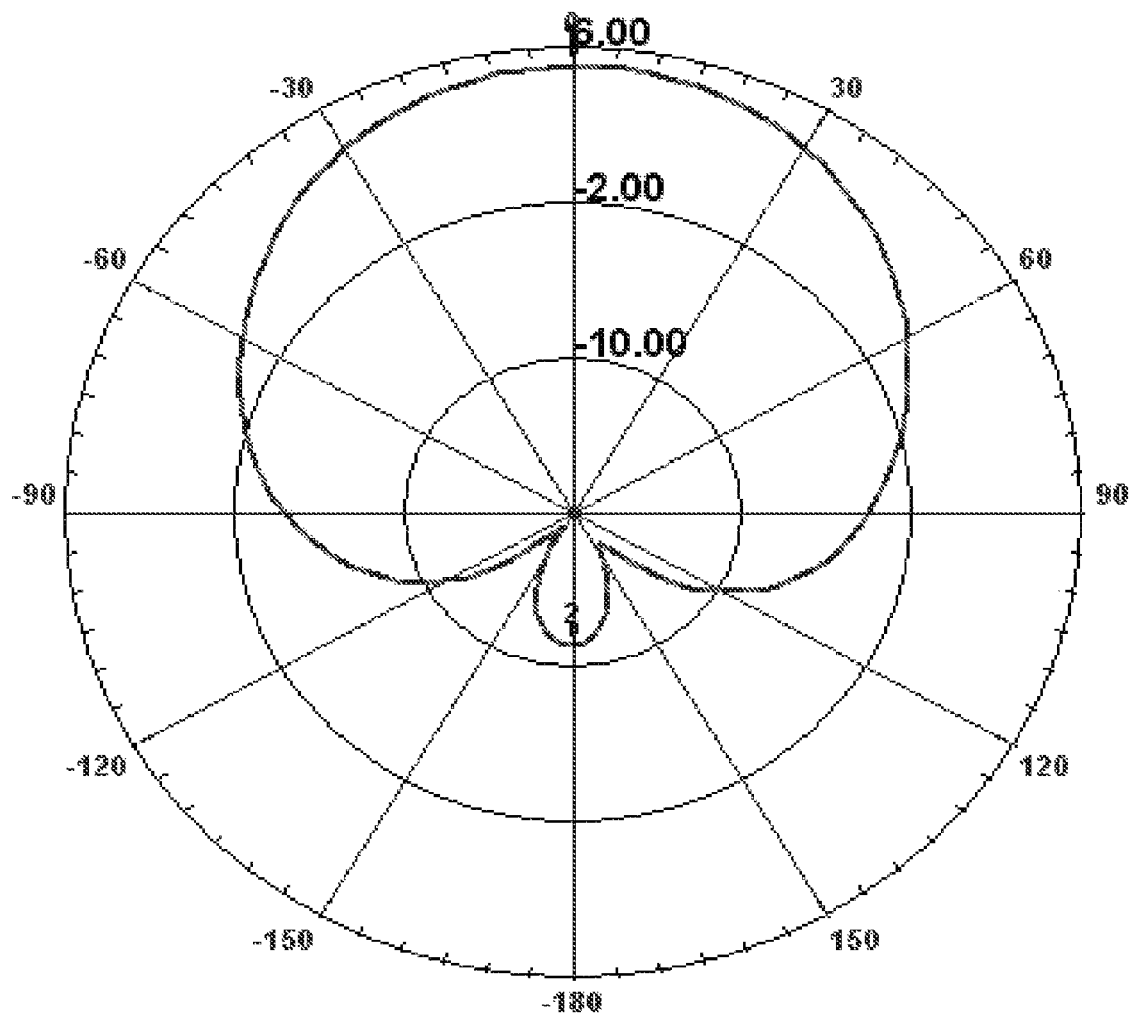
FIG. 7 is a radiation pattern illustrating the performance of an exemplary patch antenna constructed in accordance with the principles of the present invention.

In contrast, by utilizing the entire area of the PCB 30 to provide a ground plane 36 for the patch antenna assembly 40, which as mentioned previously is about 4 times that of the patch area, the performance of the patch antenna 40 as constructed in the present invention is considerably improved over that of the prior art. In other words, the patch antenna construction of the present invention provides higher gain and better directivity than prior methods of constructing patch antennas for use in handheld combination RFID/barcode readers. Of particular importance is the improved directivity of the patch antenna 40. As shown in FIG. 7, a patch antenna constructed in accordance with the principles of the present invention exhibits a radiation pattern much closer to the ideal case than prior art antennas. The patch antenna 40 of the present invention generally has an antenna gain of about 3.5 dBi which is nearly 2 dB higher than that of the case shown in FIG. 6 where the ground plane size is about two times that of the patch area.

Figure 8:
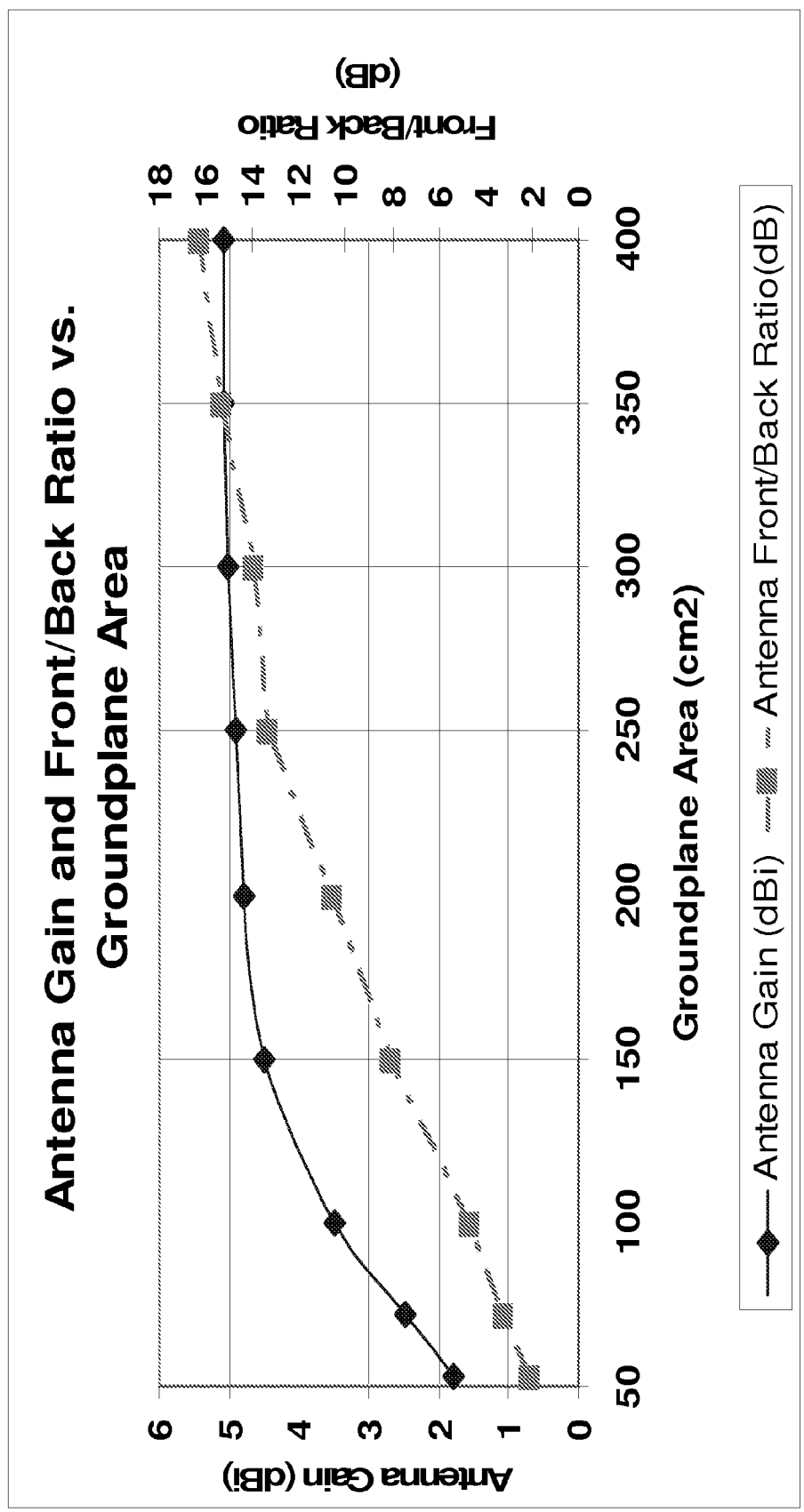
FIG. 8 is a graph illustrating antenna gain and front/back ratio of an exemplary patch antenna, constructed in accordance with the principles of the present invention, as a function of ground plane area.

Referring now to FIG. 8, a graph indicating the relationship between the antenna gain and the front to back ratio as a function of ground plane area is shown. The graph of FIG. 8 was created using three-dimensional finite element modeling techniques and varying the ground plane area for an antenna module constructed in accordance with the principles of the present invention. As the ground plane area is increased, the antenna gain increases and levels out to a maximum value of about 5 dBi. The dBi unit is dB above an isotropic radiator. The front/back ratio linearly increases until the gain flattens out and continues to increase thereafter, asymptotically approaching a theoretical limit of infinity. Thus, increasing the ground plane area beyond the size of the dielectric substrate 48 improves the antenna radiation. For a handheld device, it is important to minimize the backward radiation but to also limit the overall size since the device must be lightweight.

In an exemplary embodiment of the present invention, as shown in FIG. 4, the area of the PCB 30 for the combo handheld reader 10 is roughly 100 cm$^2$. By increasing the ground plane area from the minimum value, i.e., just covering the dielectric substrate 48, to that of the PCB area, the antenna gain is increased from 1.8 to 3.5 dBi and the front/back ratio is increased from 2.1 to 4.8 dB.

The exemplary antenna construction of the present invention exhibits numerous advantages over the prior art when used in connection with a handheld combination RFID/barcode reader. The architecture uses the ground plane for the RFID circuitry and controls to serve a dual role as the reflective ground plane for a patch antenna, thereby reducing the cost, complexity and weight of the handheld reader device. Additionally, the performance of the actual patch antenna assembly is improved over that of traditional handheld combination RFID/barcode readers, both in terms of gain and directivity, because the resulting combination ground plane is inherently larger than the ground plane achievable through conventional patch antenna module methods. Additionally, the proximity of the antenna assembly 32 to the actual circuitry reduces power loss of the RF signal, further improving RF performance.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A handheld barcode/RFID ("radio frequency identification") reader, comprising:
    a printed circuit board, including:
        a first side having at least a portion of barcode/RFID electronic circuitry affixed thereto; and
        a second side opposite the first side, the second side having a ground plane electrically coupled to the electronic circuitry; and
    a patch antenna affixed to the second side of the printed circuit board, the patch antenna being electrically coupled to the electronic circuitry and the ground plane.

2. The handheld barcode/RFID reader of claim 1, wherein the patch antenna includes:
    a dielectric material; and
    a square shaped metal patch etched on one side of the dielectric material.

3. The handheld barcode/RFID reader of claim 2, wherein an area of the ground plane is at least four times greater than an area of the metal patch.

4. The handheld barcode/RFID reader of claim 2, further comprising an RFID antenna module, the RFID module having:
    a first housing cover; and
    a second housing cover opposite the first housing cover, the second housing cover affixable to the first housing cover to define an internal cavity,
    wherein the printed circuit board and the patch antenna are encapsulated within the internal cavity.

5. The handheld barcode/RFID reader of claim 4, further comprising a housing base, the housing base defining at least one aperture, wherein the RFID antenna module is mounted to the housing base within the aperture.

6. The handheld barcode/RFID reader of claim 2, wherein the patch antenna further includes a single feedpoint located approximately halfway between a geometric center of the patch and an edge of the patch antenna.

7. The handheld barcode/RFID reader of claim 2, wherein the metal patch includes a pair of truncated corners, the truncated corners being aligned along a diagonal of either corner of the metal patch.

8. The handheld barcode/RFID reader of claim 2, wherein the dielectric material is at least one of ceramic, and a combination of ceramic and Teflon, the dielectric material having a relative dielectric constant of 10 or higher and a dielectric loss factor of 0.01 or less.

9. The handheld barcode/RFID reader of claim 1, wherein the second side of the printed circuit board further has at least some electronic circuitry affixed thereto.

10. An RFID ("radio frequency identification") antenna module, comprising:
    a printed circuit board, including:
        a first side having at least a portion of electronic RFID circuitry affixed thereto; and
        a second side opposite the first side, the second side having a ground plane electrically coupled to the electronic circuitry; and
    a patch antenna affixed to the second side of the printed circuit board, the patch antenna being electrically coupled to the electronic circuitry and the ground plane.

11. The RFID antenna module of claim 10, wherein the patch antenna includes:
    a dielectric material; and
    a square shaped metal patch etched on one side of the dielectric material.

12. The RFID antenna module of claim 11, wherein an area of the ground plane is at least four times greater than an area of the metal patch.

13. The RFID antenna module of claim 11, wherein the metal patch includes a pair of truncated corners, the truncated corners being aligned along a diagonal of either corner of the metal patch.

14. The RFID antenna module of claim 11, wherein the patch antenna further includes a single feedpoint located approximately halfway between a geometric center of the patch and an edge of the patch antenna.

15. The RFID antenna module of claim 11, wherein the metal patch includes notches on all four corners of the square shaped metal patch.

16. The RFID antenna module of claim 11, wherein the dielectric material is at least one of ceramic, and a combination of ceramic and Teflon, the dielectric material having a relative dielectric constant of 10 or higher and a dielectric loss factor of 0.01 or less.

17. The RFID antenna module of claim 11, further comprising:
    a first housing cover; and
    a second housing cover opposite the first housing cover, the second housing cover being affixable to the first housing cover to define an internal cavity,
    wherein the printed circuit board and the patch antenna are encapsulated within the internal cavity.

18. A method for manufacturing an RFID ("radio frequency identification") antenna module having a printed circuit board with a first side and a second side opposite the first side, the second side having a ground plane for electronic RFID circuitry, the method comprising:
    affixing at least a portion of the electronic RFID circuitry to the first side;
    electrically connecting the electronic RFID circuit to the ground plane;
    mounting a patch antenna to the second side of the printed circuit board, the patch antenna being in electrical communication with the RFID circuitry on the first side and the ground plane on the second side.

19. The method of claim 18, wherein the patch antenna includes:
    a dielectric material; and
    a square shaped metal patch etched on one side of the dielectric material.

20. The method of claim 18, wherein an area of the ground plane is at least four times greater than an area of the metal patch.

* * * * *